(12) United States Patent
Patel et al.

(10) Patent No.: US 10,000,112 B2
(45) Date of Patent: Jun. 19, 2018

(54) PELVIC LOAD MANAGEMENT USING INTEGRATED COLLAPSIBLE FEATURES IN DOOR TRIM PANEL

(71) Applicant: FORD GLOBAL TECHNOLOGIES, LLC, Dearborn, MI (US)

(72) Inventors: Deepak Patel, Canton, MI (US); Li Lu, Bloomfield Hills, MI (US); Linh Doan, Belleville, MI (US); Bhavani Thota, Novi, MI (US); Kris Allyn Warmann, Plymouth, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 43 days.

(21) Appl. No.: 15/259,834

(22) Filed: Sep. 8, 2016

(65) Prior Publication Data

US 2018/0065454 A1 Mar. 8, 2018

(51) Int. Cl.
*B60N 99/00* (2006.01)
*B60J 5/04* (2006.01)
*B60R 21/04* (2006.01)
*B60R 21/00* (2006.01)

(52) U.S. Cl.
CPC .......... *B60J 5/045* (2013.01); *B60R 21/0428* (2013.01); *B60R 2021/0055* (2013.01); *B60R 2021/0414* (2013.01)

(58) Field of Classification Search
CPC .................. B60J 5/045; B60R 21/0428; B60R 2021/0055; B60R 2021/0414
See application file for complete search history.

(56) References Cited

U.S. PATENT DOCUMENTS

| 5,577,794 | A | * | 11/1996 | Gandhi | B60J 5/0425 |
| | | | | | 280/750 |
| 5,603,548 | A | * | 2/1997 | Gandhi | B60J 5/0451 |
| | | | | | 280/748 |
| 5,989,699 | A | * | 11/1999 | Kuczynski | B29C 44/025 |
| | | | | | 264/46.6 |
| 7,313,247 | B1 | * | 12/2007 | Tilli | H04R 1/025 |
| | | | | | 381/386 |
| 8,029,041 | B2 | | 10/2011 | Hall et al. | |
| 8,763,308 | B2 | | 7/2014 | Roy et al. | |
| 9,193,247 | B2 | | 11/2015 | Patel et al. | |
| 9,649,916 | B2 | * | 5/2017 | Hamdoon | B60J 5/0456 |
| 2016/0339862 | A1 | * | 11/2016 | Deng | B60R 21/0428 |

FOREIGN PATENT DOCUMENTS

| GB | 2238989 A | 6/1991 |
| JP | 2004299631 A | 10/2004 |
| JP | 2007216851 A | 8/2007 |
| JP | 5724863 B2 | 5/2015 |

OTHER PUBLICATIONS

English Machine Translation of JP2004299631A.
English Machine Translation of JP2007216851A.
English Machine Translation of JP5724863B2.

* cited by examiner

*Primary Examiner* — Lori Lynn Lyjak
(74) *Attorney, Agent, or Firm* — Vichit Chea; King & Schickli PLLC

(57) ABSTRACT

A door assembly for a vehicle includes a door panel and a door trim panel comprising a shaped pelvic load path energy-absorbing feature disposed on a door panel-facing surface of the door trim panel. The shaped pelvic load path energy-absorbing feature is defined by a plurality of stepped surfaces, which in turn may define as various cross-sectional shapes for the shaped pelvic load path energy-absorbing feature.

18 Claims, 4 Drawing Sheets

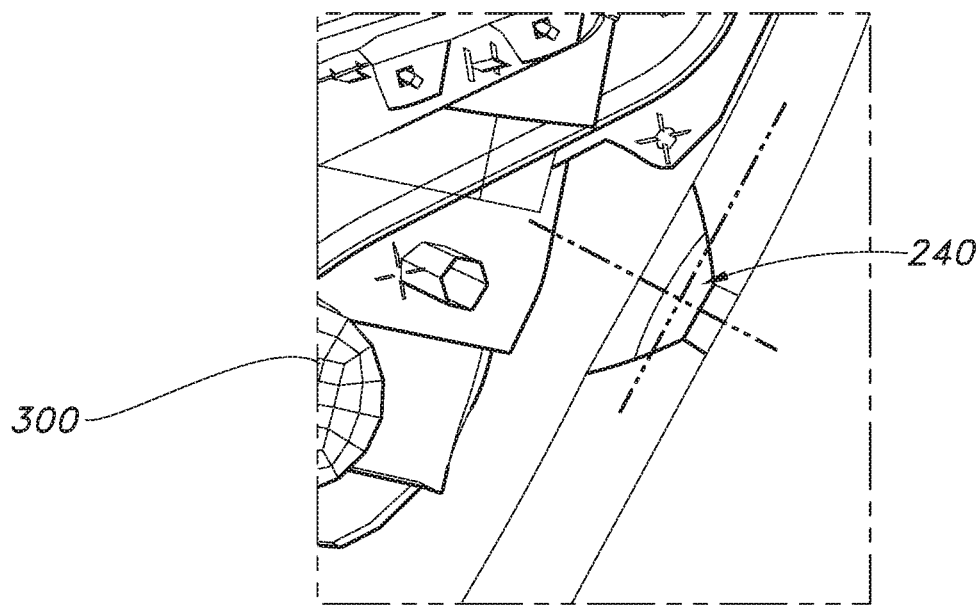
FIG. 3A
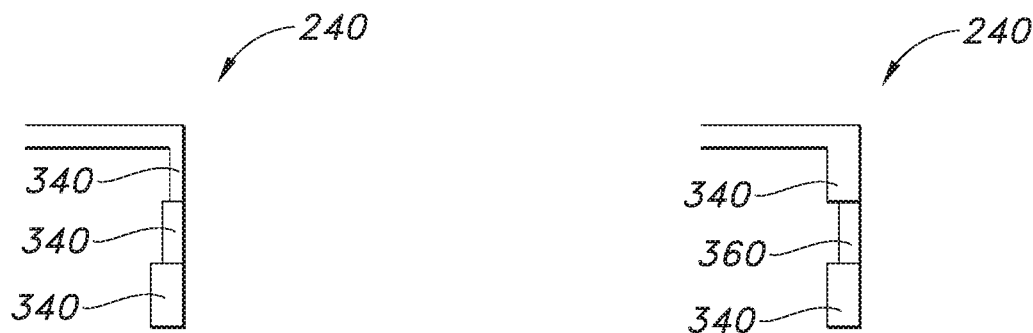
FIG. 3B
FIG. 3C

PELVIC LOAD MANAGEMENT USING INTEGRATED COLLAPSIBLE FEATURES IN DOOR TRIM PANEL

TECHNICAL FIELD

This disclosure relates generally to vehicle doors. More particularly, the disclosure relates to a door trim panel including a shaped pelvic load path energy-absorbing feature to reduce pelvic load to a vehicle occupant on receiving a side impact.

BACKGROUND

Side impacts to vehicles typically impose a dynamic load onto the vehicle and vehicle occupant. This places a severe stress on the occupant's body and may result in displacement of the pelvic region of the occupant. For this reason, during side impacts pelvic load must be shown to meet target loading requirements. To meet such target loading requirements, vehicle deforming systems must be appropriately designed. Conventional body structure/body interior countermeasures for meeting target pelvic load, while effective for their intended purpose, add cost and weight to a vehicle.

To address this issue, the present disclosure relates to alternative energy-absorbing measures to meet target pelvic loading requirements. In particular, the disclosure relates to a vehicle door trim panel designed to absorb energy of side impacts and meet target pelvic loading requirements solely by the trim panel design, and without requiring additional body structure/body interior countermeasures. The described door trim panel controls an interaction between the vehicle door trim and sheet metal during side impact by enhancing collapsibility of the door trim, reducing a pelvic load imposed on a vehicle occupant.

SUMMARY

In accordance with the purposes and benefits described herein, in one aspect a door assembly for a vehicle is described, comprising a door panel and a door trim panel comprising a shaped pelvic load path energy-absorbing feature disposed on a door panel-facing surface of the door trim panel. The shaped pelvic load path energy-absorbing feature may be defined by a plurality of stepped surfaces.

In embodiments, the plurality of stepped surfaces are defined in a material of the door trim panel and may define a discontinuous stepped cross-section, an arcuate stepped cross-section, a v-shaped stepped cross-section, or an inclined stepped cross-section for the shaped pelvic load path energy-absorbing feature. In embodiments, the plurality of stepped surfaces are defined in the material of the door trim panel by one or more of molding, cutting, sculpting, and scoring.

In other aspects, trim panels for a vehicle door are described, comprising a vehicle interior-facing surface, a shut face, and a vehicle door panel-facing surface comprising a shaped pelvic load path energy-absorbing feature disposed on a door panel-facing surface of the door trim panel. The shaped pelvic load path energy-absorbing feature may be defined by a plurality of stepped surfaces as described above, disposed along a pelvic load path of the trim panel.

In the following description, there are shown and described embodiments of the disclosed door trim panel, and of doors including same. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed door trim panel, and together with the description serve to explain certain principles thereof. In the drawing:

FIG. 3A depicts an alternative embodiment of a shaped pelvic load path energy-absorbing feature according to the present disclosure;

FIG. 3B depicts an embodiment of a zz cross-section for the shaped pelvic load path energy-absorbing feature of FIG. 3A; and FIG. 3C depicts an alternative embodiment of a zz cross-section for the shaped pelvic load path energy-absorbing feature of FIG. 3A.

Reference will now be made in detail to embodiments of the disclosed door trim panel, examples of which are illustrated in the accompanying drawing figures.

DETAILED DESCRIPTION

Figure 1:
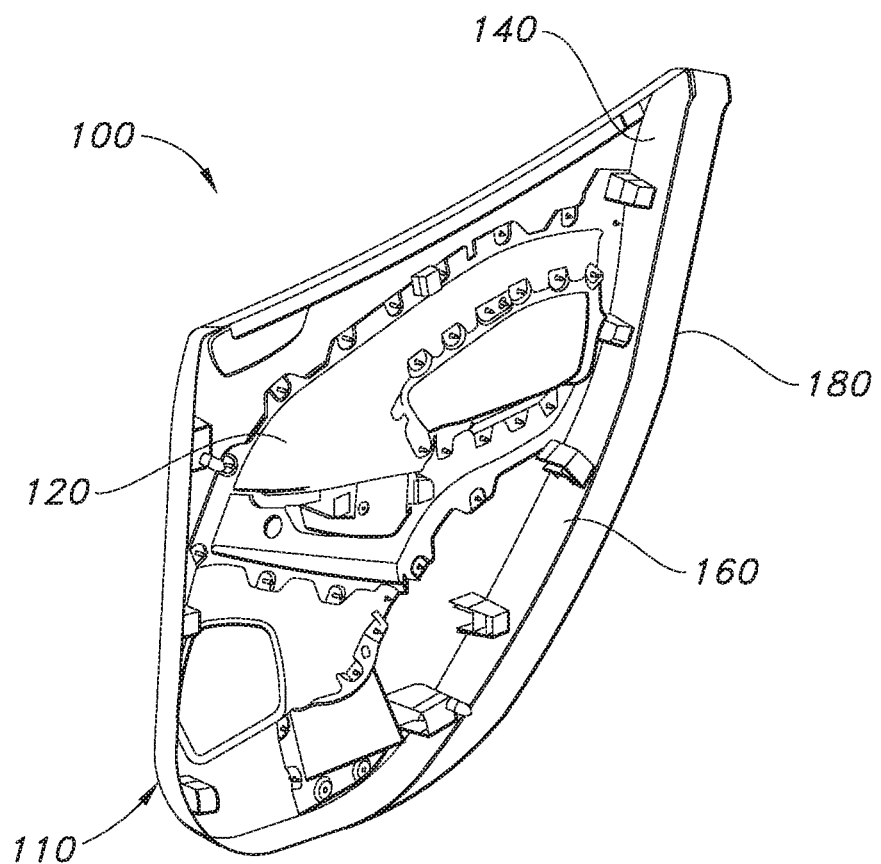
FIG. 1 depicts a prior art door assembly for a vehicle.

FIG. 1 shows a prior art door assembly 100, including a door trim panel 110 having a vehicle interior-facing surface 120, a shut face 140, and a door panel-facing surface 160 configured to matingly fasten to a door panel 180. For such a prior art door panel, additional body structure/body interior countermeasures to address pelvic load on side impact are required as summarized above.

Figure 2A:
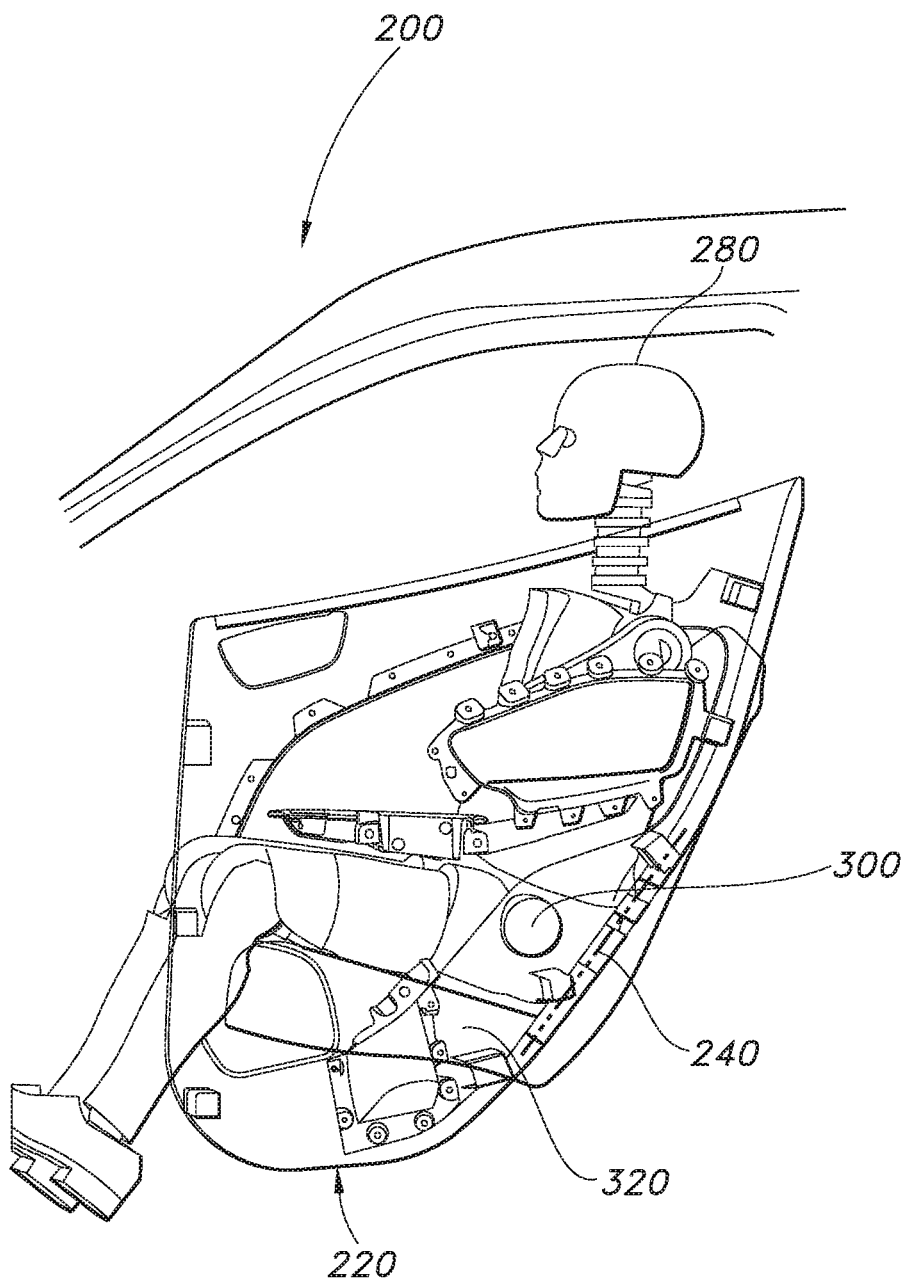
FIG. 2A depicts a vehicle including a door trim panel including an embodiment of a shaped pelvic load path energy-absorbing feature according to the present disclosure.

To solve this and other problems, with reference to FIG. 2A a vehicle 200 including a door trim panel 220 attached to a door panel (not shown for convenience) is shown. The door trim panel 220 door panel-facing surface includes a shaped pelvic load path energy-absorbing feature 240, positioned in the door trim panel along an area corresponding to a location that a pelvic load would be imposed on a vehicle occupant (for example, crash test dummy 280) in the event of a side impact.

In the embodiment shown in the drawing figure, the shaped pelvic load path energy-absorbing feature 240 is disposed according to the crash test dummy 280's H-point 300, i.e. the relative location of an occupant's hip when seated in a vehicle seat 320. As is known, the H-point (or hip-point) is defined relative to other features and may be vehicle-specific. For example, a vehicle 200 described as having a "high H-point" may have an H-point that is high relative to the vehicle floor, the road surface on which the vehicle travels, or both in accordance with the point from which the H-point is measured. It will be appreciated that the disposition of the shaped pelvic load path energy-absorbing feature 240 may be in accordance with alternative measurements. For example, certain regulatory agencies define the H-point as the actual hip point of a seated crash test dummy, and define an R-point (or seating reference point) as a theoretical hip point describing the relative location of a seated crash test dummy's hip point when the vehicle seat is set in a rearmost and lowermost seating position.

Figure 2B:
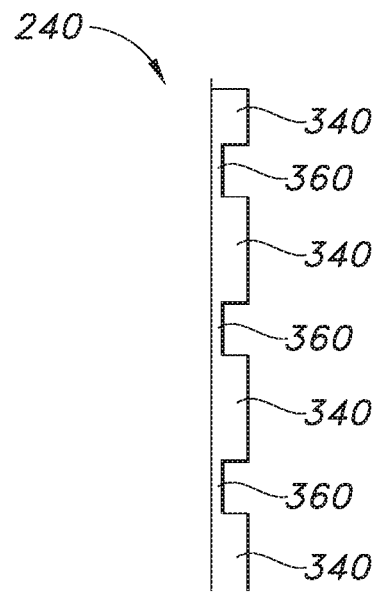
FIG. 2B depicts an embodiment of a yy cross-section for the shaped pelvic load path energy-absorbing feature of FIG. 2A.
Figure 2C:
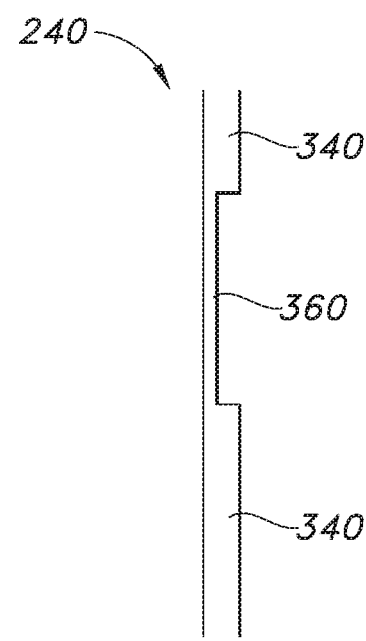
FIG. 2C depicts an alternative embodiment of a yy cross-section for the shaped pelvic load path energy-absorbing feature of FIG. 2A.

A number of configurations are contemplated for the shaped pelvic load path energy-absorbing feature 240. The shaped pelvic load path energy-absorbing feature 240 may be defined in the vehicle-yy and vehicle-zz axes by stepped features comprising a sequential series of ridges 340 and channels 360. In one embodiment, the shaped pelvic load path energy-absorbing feature 240 defines a yy axis cross section comprising stepped features in combination defining a discontinuous stepped yy axis cross section (see FIG. 2B). In other embodiments, the shaped pelvic load path energy-absorbing feature 240 defines a yy axis cross section comprising ridges 340 and an intervening channel 360, in combination defining an arcuate stepped yy axis cross-section (see FIG. 2C).

Figure 2D:
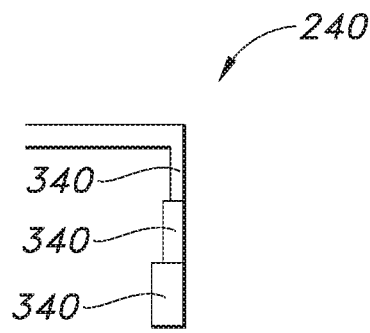
FIG. 2D depicts an embodiment of a zz cross-section for the shaped pelvic load path energy-absorbing feature of FIG. 2A.
Figure 2E:
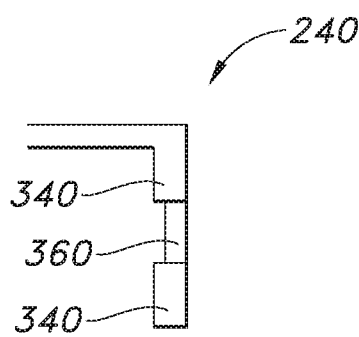
FIG. 2E depicts an alternative embodiment of a zz cross-section for the shaped pelvic load path energy-absorbing feature of FIG. 2A.

In one embodiment, the shaped pelvic load path energy-absorbing feature 240 defines a zz axis cross section comprising stepped features (ridges 340) in combination defining an inclined zz axis cross section (see FIG. 2D). In another embodiment, the shaped pelvic load path energy-absorbing feature 240 defines a zz axis cross section comprising ridges 340 and an intervening channel 360 in combination defining an arcuate stepped zz axis cross-section (see FIG. 2E).

In still other embodiments, the shaped pelvic load path energy-absorbing feature 240 is defined by stepped features in combination defining a V-shaped yy axis cross-section (see FIG. 3A). As in the above-described embodiments, the shaped pelvic load path energy-absorbing feature 240 may define a zz axis cross section comprising stepped features (ridges 340) in combination defining an inclined zz axis cross section (see FIG. 3B). In another embodiment, the shaped pelvic load path energy-absorbing feature 240 may define a zz axis cross section comprising ridges 340 and an intervening channel 360 in combination defining an arcuate stepped zz axis cross-section (see FIG. 3C).

By the described door trim panel 220 including the shaped pelvic load path energy-absorbing feature 240, collapsibility of the door trim panel is enhanced, thereby reducing pelvic load on side impact only by the configuration of the door trim panel which controls the interaction between the door panel 180 and the door trim panel, without need of any additional side impact pelvic load countermeasures. As will be appreciated, the described shaped pelvic load path energy-absorbing feature 240 may be positioned as needed on the door trim panel 220 by any suitable method, including without intending any limitation by molding during fabrication of the door panel, or by cutting, sculpting, and/or scoring the door trim panel after initial molding. Likewise, the specific dimensions and shapes of the shaped pelvic load path energy-absorbing feature 240 may be provided according to specific vehicle configurations and pelvic load target requirements. The skilled artisan will readily be able to ascertain such pelvic load target requirements from publically available materials.

Obvious modifications and variations are possible in light of the above teachings. For example, collapsibility of the described door trim panel 220 may be further enhanced by selection of particular materials. All such modifications and variations are within the scope of the appended claims when interpreted in accordance with the breadth to which they are fairly, legally and equitably entitled.

What is claimed:

1. A door assembly for a vehicle, comprising:
a door panel; and
a door trim panel defining a shaped pelvic load path energy-absorbing feature disposed on a door panel-facing surface of the door trim panel.

2. The door assembly of claim 1, wherein the shaped pelvic load path energy-absorbing feature is defined by a plurality of stepped surfaces.

3. The door assembly of claim 2, wherein the plurality of stepped surfaces define one or more of a discontinuous stepped cross-section, an arcuate stepped cross-section, a v-shaped stepped cross-section, or an inclined stepped cross-section for the shaped pelvic load path energy-absorbing feature.

4. The door assembly of claim 2, wherein the plurality of stepped surfaces are defined in the material of the door trim panel by one or more of molding, cutting, sculpting, and scoring.

5. A vehicle including the door assembly of claim 1.

6. A trim panel for a vehicle door, comprising:
a vehicle interior-facing surface; and
a vehicle door panel-facing surface defining a shaped pelvic load path energy-absorbing feature.

7. The trim panel of claim 6, wherein the shaped pelvic load path energy-absorbing feature is defined by a plurality of stepped surfaces.

8. The trim panel of claim 7, wherein the plurality of stepped surfaces define one or more of a discontinuous stepped cross-section, an arcuate stepped cross-section, a v-shaped stepped cross-section, or an inclined stepped cross-section for the shaped pelvic load path energy-absorbing feature.

9. The trim panel of claim 7, wherein the plurality of stepped surfaces are defined in the material of the trim panel by one or more of molding, cutting, sculpting, and scoring.

10. A vehicle door including the door trim panel of claim 6.

11. A vehicle including the vehicle door of claim 10.

12. A vehicle door trim panel, comprising:
a vehicle interior-facing surface;
a shut face;
a vehicle door panel-facing surface; and
a shaped pelvic load path energy-absorbing feature defined in one or both of the vehicle door panel-facing surface and the shut face.

13. The door trim panel of claim 12, wherein the shaped pelvic load path energy-absorbing feature is defined by a plurality of stepped surfaces.

14. The door trim panel of claim 13, wherein the plurality of stepped surfaces are defined in a material of the door trim panel.

15. The door trim panel of claim 14, wherein the plurality of stepped surfaces define one or more of a discontinuous stepped cross-section, an arcuate stepped cross-section, a v-shaped stepped cross-section, or an inclined stepped cross-section.

16. The door trim panel of claim 14, wherein the plurality of stepped surfaces are defined in the material of the door trim panel by one or more of molding, cutting, sculpting, and scoring.

17. A vehicle door including the door trim panel of claim 12.

18. A vehicle including the vehicle door of claim 17.

\* \* \* \* \*